United States Patent
Qian et al.

(10) Patent No.: US 11,606,354 B2
(45) Date of Patent: Mar. 14, 2023

(54) UNLOCKING METHOD AND SYSTEM FOR AIR CONDITIONER UNIT

(71) Applicant: Carrier Corporation, Palm Beach Gardens, FL (US)

(72) Inventors: Liang Qian, Shanghai (CN); Christophe Lecouvreur, Tignieu-Jameyzieu (FR); Arun Kumar Bakurupanda, Telangana (IN); Shariq Suhail Mohammad, Telangana (IN); Satish Nalla, Telangana (IN); Phani Pavan Kumar Mangaiahgari, Telangana (IN); Hong Zhang, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 277 days.

(21) Appl. No.: 16/800,795

(22) Filed: Feb. 25, 2020

(65) Prior Publication Data
US 2020/0280558 A1 Sep. 3, 2020

(30) Foreign Application Priority Data
Mar. 1, 2019 (CN) .......................... 201910155641.7

(51) Int. Cl.
*H04L 9/40* (2022.01)
*G06F 3/023* (2006.01)
(Continued)

(52) U.S. Cl.
CPC .......... *H04L 63/0846* (2013.01); *F24F 11/49* (2018.01); *F24F 11/56* (2018.01);
(Continued)

(58) Field of Classification Search
CPC . H04L 63/0846; H04L 9/0869; H04L 9/3242; H04L 63/0823; F24F 11/49;
(Continued)

(56) References Cited

U.S. PATENT DOCUMENTS 8,469,260 B2 6/2013 Lyons et al.
9,111,002 B2 8/2015 Pronold
(Continued)

FOREIGN PATENT DOCUMENTS

WO 2018174828 A1 9/2018

OTHER PUBLICATIONS

European Search Report for application EP 20159357.1, dated May 6, 2020, 88 pages.
(Continued)

*Primary Examiner* — Dereena T Cattungal
(74) *Attorney, Agent, or Firm* — Cantor Colburn LLP

(57) ABSTRACT

An unlock method and system for an air-conditioning unit. The unlock system includes: a display apparatus; an input apparatus; and a control apparatus in communication with the display apparatus and the unlock system is configured to perform the following operations: generating a dynamic graphic according to at least an identification code and an update code; generating an unlock password according to at least a certificate, the identification code and the update code; receiving an unlock password through the input apparatus; comparing the unlock password received from the input apparatus with the generated unlock password; and granting a corresponding permission if the acquired unlock password is consistent with the generated unlock password.

20 Claims, 1 Drawing Sheet

(51) Int. Cl.
*F24F 11/49* (2018.01)
*F24F 11/56* (2018.01)
*G06F 3/041* (2006.01)
*G06F 3/04886* (2022.01)
*G06K 19/06* (2006.01)
*H04L 9/08* (2006.01)
*H04L 9/32* (2006.01)

(52) U.S. Cl.
CPC .......... *G06F 3/0233* (2013.01); *G06F 3/0416* (2013.01); *G06F 3/04886* (2013.01); *G06K 19/06037* (2013.01); *H04L 9/0869* (2013.01); *H04L 9/3242* (2013.01); *H04L 63/0823* (2013.01)

(58) Field of Classification Search
CPC ...... F24F 11/56; G06F 3/0233; G06F 3/0416; G06F 3/04886; G06K 19/06037
USPC .......................................................... 726/19
See application file for complete search history.

(56) References Cited

U.S. PATENT DOCUMENTS

| | | | |
|---|---|---|---|
| 9,227,136 | B2 | 1/2016 | Cage et al. |
| 9,292,811 | B2 | 3/2016 | O'Brien et al. |
| 9,430,575 | B2 | 8/2016 | Addy et al. |
| 9,455,839 | B2 | 9/2016 | Conrad et al. |
| 9,479,499 | B2 | 10/2016 | Wang |
| 9,501,768 | B2 | 11/2016 | Ho et al. |
| 9,603,019 | B1 | 3/2017 | Ramatchandirane et al. |
| 9,659,287 | B2 | 5/2017 | Moshal |
| 9,659,424 | B2 | 5/2017 | Huber et al. |
| 9,801,064 | B2 | 10/2017 | Kelts et al. |
| 9,824,530 | B2 | 11/2017 | Cage et al. |
| 9,852,578 | B2 | 12/2017 | Nelson et al. |
| 9,870,548 | B1 | 1/2018 | Sangani et al. |
| 10,050,952 | B2 | 8/2018 | Shi |
| 2010/0275010 | A1* | 10/2010 | Ghirardi ................. G06F 21/36 713/155 |
| 2011/0128119 | A1* | 6/2011 | Rao .......................... H04M 1/66 340/5.6 |
| 2013/0173484 | A1* | 7/2013 | Wesby ................. G06K 7/1413 705/318 |
| 2014/0337634 | A1* | 11/2014 | Starner ................... G06F 21/32 713/186 |
| 2014/0375422 | A1* | 12/2014 | Huber ................ G07C 9/00571 340/5.61 |
| 2015/0167995 | A1 | 6/2015 | Fadell et al. |
| 2016/0036814 | A1* | 2/2016 | Conrad ............... H04L 63/0428 713/171 |
| 2016/0042602 | A1* | 2/2016 | Phan ...................... H04L 63/10 726/5 |
| 2016/0071319 | A1 | 3/2016 | Fallon et al. |
| 2016/0260271 | A1* | 9/2016 | Belhadia ................ G06F 21/35 |
| 2017/0048257 | A1 | 2/2017 | Hamid |
| 2017/0237565 | A1* | 8/2017 | Rommel ............... H04L 9/0863 713/171 |
| 2017/0257358 | A1* | 9/2017 | Ebrahimi ............ H04L 63/0861 |
| 2017/0364106 | A1 | 12/2017 | Smith et al. |
| 2017/0372055 | A1* | 12/2017 | Robinson .............. H04W 12/64 |
| 2018/0109906 | A1 | 4/2018 | Sentz et al. |
| 2018/0159835 | A1* | 6/2018 | Iida ..................... H04L 63/0846 |
| 2018/0253576 | A1 | 9/2018 | Talbot |
| 2019/0149537 | A1* | 5/2019 | Ebrahimi ............ H04L 63/0442 713/171 |
| 2020/0357214 | A1* | 11/2020 | Harwell ................... G07C 9/33 |
| 2021/0258308 | A1* | 8/2021 | Avetisov ............... H04L 9/3234 |

OTHER PUBLICATIONS

Domestic Corporation, "Smart Touch Cabin Control Installation & Operations Manual", Rev. 20151221, 2011-2015, 44 pages.
Gibson Research Corporation, "Secure Quick Reliable Login" available at: https://www.grc.com/sqrl/sqrl.htm, accessed Oct. 22, 2018, 9 pages.
Istyaq, Salim, "Hybrid Authentication System Using QR Code with OTP", World Academy of Science, Engineering and Technology International Journal of Computerand Information Engineering vol. 10, No. 6, 2016, 4 pages.

* cited by examiner

UNLOCKING METHOD AND SYSTEM FOR AIR CONDITIONER UNIT

FOREIGN PRIORITY

This application claims priority to Chinese Patent Application No. 201910155641.7, filed Mar. 1, 2019, and all the benefits accruing therefrom under 35 U.S.C. § 119, the contents of which in its entirety are herein incorporated by reference.

TECHNICAL FIELD

This application relates to the field of safety management of air-conditioning units, and more specifically, to an unlock method for an air-conditioning unit, which allows a user to log into a control system of an air-conditioning unit dynamically and safely. This application also relates to an unlock system for an air-conditioning unit.

BACKGROUND ART

An existing air-conditioning unit generally provides a permanent or periodically updated fixed password for a user to log into a control system. For example, the password can be a four-digit numeral. However, the fixed password brings about a potential safety risk. For example, an unauthorized person may obtain the password and log into the control system of the air-conditioning unit. Moreover, there are also potential risks that the fixed password is prone to be forgotten or brute-force broken.

Therefore, there is a persistent demand for an improved unlock method and unlock system, and the solution is expected to allow a user to log in dynamically and safely.

SUMMARY OF THE INVENTION

An objective of this application is to provide an unlock method for an air conditioning unit, which can provide a password dynamically to selectively control login of a user. Another objective of this application is to provide an unlock system for an air-conditioning unit.

The objectives of this application are achieved through the following technical solutions:

An unlock method for an air-conditioning unit, including the following steps:

S1: a control apparatus generating a dynamic graphic according to at least an identification code and an update code and presenting the dynamic graphic on a display apparatus, and generating an unlock password according to a certificate, the identification code and the update code;

S2: a user terminal device acquiring the dynamic graphic and sending the dynamic graphic to a server;

S3: the server decoding the dynamic graphic to obtain at least the identification code and the update code;

S4: the server obtaining an unlock password according to a certificate, the identification code and the update code;

S5: the server sending the unlock password to the user terminal device;

S6: the user terminal device displaying the unlock password;

S7: inputting the unlock password through an input device; and

S8: the control apparatus comparing the generated unlock password with the input unlock password to judge whether to grant a corresponding permission.

In the foregoing unlock method, optionally, the update code is regenerated according to one of the following conditions: a predetermined time has expired, or a manual refresh request is received.

In the foregoing unlock method, optionally, the dynamic graphic includes a QR code, a bar code, a numeral, a letter, or a combination thereof.

In the foregoing unlock method, optionally, in step S2, the user terminal device acquires the dynamic graphic through an optical input device or by manual input of the user.

In the foregoing unlock method, optionally, the update code includes a randomly generated character string.

In the foregoing unlock method, optionally, the certificate is a share certificate stored in the server and the control apparatus, and an algorithm for the control apparatus to generate the unlock password in step S1 is the same as an algorithm for the server to generate the unlock password in step S5.

In the foregoing unlock method, optionally, the algorithm includes an irreversible hash algorithm.

In the foregoing unlock method, optionally, the server stores a series of identification codes and certificates corresponding to the identification codes, and in step S4, the server looks for a certificate corresponding to the identification code according to the identification code.

In the foregoing unlock method, optionally, the identification code includes a MAC address.

In the foregoing unlock method, optionally, the step of granting a corresponding permission includes granting a control or debugging permission of the air-conditioning unit in a predetermined time.

An unlock system for an air-conditioning unit, including: a display apparatus; an input apparatus in communication with the display apparatus; and a control apparatus configured to perform the following operations: generating a dynamic graphic according to at least an identification code and an update code; generating an unlock password according to at least a certificate, the identification code and the update code; receiving an unlock password through the input apparatus; comparing the unlock password received from the input apparatus with the generated unlock password; and granting a corresponding permission if the acquired unlock password is consistent with the generated unlock password.

In the foregoing unlock system, optionally, the control apparatus regenerates the update code according to one of the following conditions: a predetermined time has expired, or a manual refresh request is received.

In the foregoing unlock system, optionally, the dynamic graphic includes a QR code, a bar code, a numeral, a letter, or a combination thereof.

In the foregoing unlock system, optionally, the update code includes a randomly generated character string.

In the foregoing unlock system, optionally, the control apparatus generates the unlock password according to an irreversible hash algorithm.

In the foregoing unlock system, optionally, the identification code includes a MAC address.

In the foregoing unlock system, optionally, the operation of granting a corresponding permission includes granting a control or debugging permission of the air-conditioning unit in a predetermined time.

In the foregoing unlock system, optionally, the operation of granting a corresponding permission includes displaying content and a page corresponding to the permission on the display apparatus.

In the foregoing unlock system, optionally, the display apparatus includes a touch screen.

In the foregoing unlock system, optionally, the input apparatus includes a physical keyboard or a virtual keyboard located on the touch screen.

The unlock method and system for an air-conditioning unit according to this application are advantageous in a simple structure, easy manufacturing, convenient use, and the like, and can improve the safety of the air-conditioning unit and user login.

BRIEF DESCRIPTION OF THE DRAWINGS

This application is described in further detail in the following with reference to accompanying drawings and preferred embodiments. However, those skilled in the art will understand that these accompanying drawings are drawn merely for explaining the preferred embodiments, and thus should not be considered as limitations on the scope of this application. Moreover, unless otherwise specified, the accompanying drawings are merely intended to conceptually express the composition or construction of the described object and may include exaggerations, and the accompanying drawings are not necessarily drawn proportionally.

DETAILED DESCRIPTION

Figure 1:
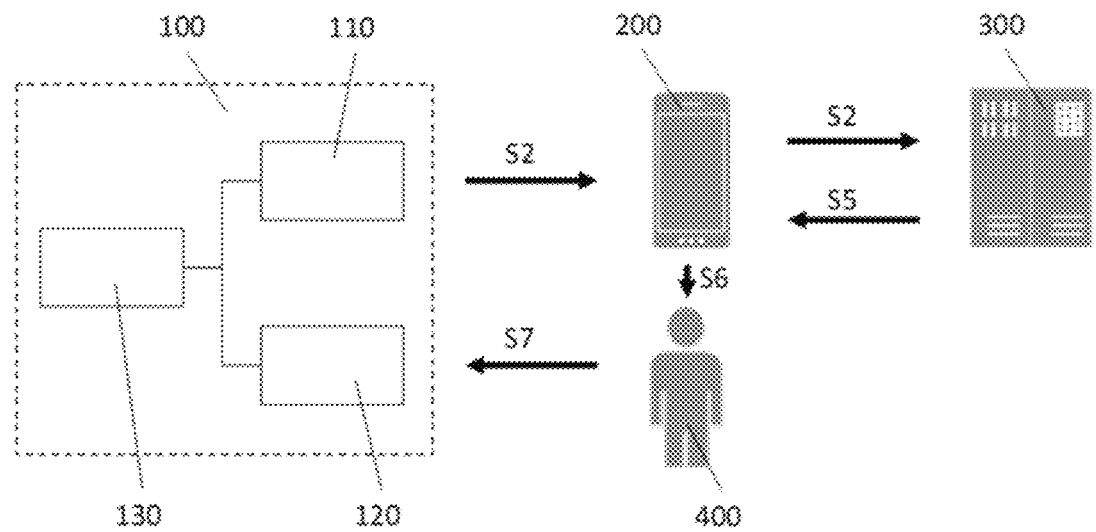
FIG. 1 is a schematic principle diagram of an unlock system and method according to this application.

In the following, preferred embodiments of this application will be described in detail with reference to the accompanying drawings. Those skilled in the art will understand that these descriptions are merely descriptive and exemplary, and should not be construed as limiting the protection scope of this application.

First, it should be noted that orientation terms such as top, bottom, upward, downward and the like mentioned in this text are defined relative to directions in the accompanying drawings, and they are relative concepts and thus can be changed according to different positions and different use states thereof. Therefore, these or other orientation terms should not be construed as restrictive terms.

Moreover, it should be further noted that, for any single technical feature described or implied in the embodiments of this text or any single technical feature shown or implied in the accompanying drawings, these technical features (or equivalents thereof) can be combined to obtain other embodiments of this application that are not mentioned directly in this text.

It should be noted that, in different accompanying drawings, identical reference numerals represent identical or substantially identical components.

FIG. 1 is a schematic principle diagram of an unlock system and method according to this application. An unlock system 100 for an air-conditioning unit includes: a display apparatus 110, an input apparatus 120, and a control apparatus 130. The control apparatus 130 is electrically connected to at least the display apparatus 110 and the input apparatus 120, and the input apparatus 120 can communicate with the display apparatus 110.

The display apparatus 110 can be any suitable display device including, but not limited to, a television, an LED display screen, an LCD display screen, an electronic ink display screen, and the like. The input apparatus 120 can be any suitable input device including an external keyboard, a physical keyboard, a virtual keyboard, a voice input apparatus, and the like. In an embodiment, the display apparatus 110 is a touch screen having an input function, and the input apparatus 120 can be a virtual keyboard selectively displayed on the touch screen. The control apparatus 130 can be any suitable processor, e.g., any suitable data processing device on the air-conditioning unit, which includes, but is not limited to, a digital signal processor, a single-chip computer, a universal central processing unit, a processor having ARM architecture, and the like. The unlock system 100 can be set in an air-conditioning unit, physically attached to the air-conditioning unit, constructed as a detachable component, or remotely connected to the air-conditioning unit.

Specifically, the control apparatus 130 is configured to perform the following operations: generating a dynamic graphic according to at least an identification code and an update code; generating an unlock password according to at least a certificate, the identification code and the update code; acquiring an unlock password from the input apparatus 120 based on at least the dynamic graphic presented on the display apparatus 110, i.e., receiving an unlock password through the input apparatus 120; comparing the unlock password received from the input apparatus 120 with the generated unlock password; and granting a corresponding permission to a user if the acquired unlock password is consistent with the generated unlock password.

The specific working principle of the unlock system 100 will be described in detail in the following with reference to a control method for an air-conditioning unit according to this application.

This application further provides an unlock method for an air-conditioning unit, including steps described in detail in the following, wherein step S1 to step S8 are performed sequentially.

In step S1, the control apparatus 130 generates a dynamic graphic according to at least an identification code and an update code and presents the dynamic graphic on a display apparatus 110. The control apparatus 130 further generates an unlock password according to a certificate, the identification code and the update code. The operation of generating an unlock password can be performed simultaneously with or at a different time from the operation of generating a dynamic graphic, or performed after the dynamic graphic is generated. For example, the operation of generating an unlock password can be performed at any time point before the subsequent step S8.

Specifically, the identification code includes a character string for marking a specific air-conditioning unit. The identification code can be preset and is unchangeable, and can be stored in the control apparatus 130 or read by the control apparatus 130. In an embodiment of this application, the identification code can be a MAC address of the unlock system 100. In another embodiment of this application, the identification code can be any character string preset in the unlock system 100 and used for uniquely representing the specific unlock system 100.

The update code includes a randomly generated character string, e.g., a random number character string generated by a built-in random number generator of the control apparatus 130, which includes, but is not limited to, a combination of numerals, uppercase letters and/or lowercase letters. The update code has the following function: the finally generated unlock password will be changed once the update code is regenerated. Therefore, the unlock password may be redefined by changing the update code. In an embodiment of this application, the update code is regenerated according to one of the following conditions: a predetermined time has expired, or a manual refresh request is received. The predetermined time may be any suitable time, and can be set to several seconds to several months. The length of the predetermined time can be preset or set by the user manually. The manual refresh request can be any refresh request of the user received by the control apparatus 130, e.g., a key input of the user through the input apparatus 120 or an input on the touch screen, or any instruction sent to the control apparatus 130 over a wired or wireless network.

The identification code and the update code can have any suitable length, e.g., several to dozens of characters.

The dynamic graphic can be any graphic presented on the display apparatus 110, e.g., including a QR code, a bar code, a numeral, a letter, or a combination thereof. For example, the numeral can include an Arabic numeral, and the letter can include any uppercase or lowercase English letter. The size of the display apparatus 110 is configured to be suitable for displaying one or more of the foregoing graphics, and has a sufficient resolution for performing the subsequent steps. The process of generating the above graphics according to one or more character strings is a technical specification known to those skilled in the art, and specific details and steps are not elaborated in the text.

The certificate can be any suitable encryption certificate or decryption certificate, e.g., a certificate suitable for hash encryption and decryption operations. The certificate can be pre-stored in the unlock system 100 or the control apparatus 130, and can be selectively read or called by the control apparatus 130.

The operation of generating an unlock password by the control apparatus 130 can include using an irreversible hash algorithm. The specific content of the hash algorithm is a technical specification known to those skilled in the art, and specific details and steps are not elaborated in the text.

In FIG. 1, step S1 is performed in the unlock system 100. Although not shown in FIG. 1, it is easy to understand that the control apparatus 130 generates a dynamic graphic and then sends the dynamic graphic to the display apparatus 110 for display. After generating the unlock password, the control apparatus 130 will not perform any operation that can be displayed in FIG. 1, and the generated unlock password is stored for use in the subsequent steps.

For the sake of safety, the unlock apparatus 100 according to this application is incapable of directly communicating with the server 300. The unlock apparatus 100 according to this application is completely isolated from the server 300 physically, and they are not electrically connected.

In step S2, a user terminal device 200 acquires the dynamic graphic and sends the dynamic graphic to the server 300. The user terminal device 200 can be any suitable device manually operated by the user 400, e.g., a smart phone including a camera. The process of acquiring the dynamic graphic can be implemented by special software on the user terminal device 200. The special software can be, for example, a mobile phone application or APP suitable for use in cooperation with the unlock system 100 according to this application or the air-conditioning unit including the unlock system 100 according to this application. The process of acquiring the dynamic graphic can also be implemented in other manners, e.g., photographing with an optical imaging apparatus, sensing with an infrared sensor, or the user 400 manually inputs the dynamic graphic to the user terminal device 200 after viewing the dynamic graphic.

Moreover, the user terminal device 200 can include a permission management function. For example, the user terminal device 200 is allowed to perform the operation in step S2 after login of the user 400. The permission of the user 400 can be preset or assigned by an administrator.

The process of sending the dynamic graphic to the server 300 can be implemented by any known communication means, including, but not limited to, a cellular data network, Bluetooth, infrared, a 4G or 5G network, Zigbee, a wired network connection, a wireless network connection, or the like.

In step S3, the server 300 decodes the received dynamic graphic to obtain at least the identification code and the update code. The process of decoding the dynamic graphic to obtain one or more characters is a technical specification known to those skilled in the art, and specific details and steps are not elaborated in the text.

In step S4, the server 300 obtains an unlock password according to a certificate, the identification code and the update code. The server 300 can acquire a certificate the same as the above-mentioned certificate pre-stored in the unlock system 100 or control apparatus 130, and obtain an unlock password by using an algorithm the same as the above-mentioned algorithm used by the unlock system 100 or control apparatus 130 to generate the unlock password. For example, the certificate that can be acquired by the server 300 and the certificate that can be acquired by the unlock system 100 can be preset during manufacturing of the air-conditioning unit, and it is ensured that the certificate and the algorithm for generating an unlock password in the unlock system 100 are the same as those in the server 300. The certificate can be stored in the server 300 or stored in a medium readable by the server 300.

The operation of generating an unlock password by the server 300 can include using an irreversible hash algorithm. The specific content of the hash algorithm is a technical specification known to those skilled in the art, and specific details and steps are not elaborated in the text.

In an embodiment of this application, different air-conditioning units are set in different regions, and an unlock system 100 on each air-conditioning unit includes a single certificate and an identification code. The certificate and the identification code on each air-conditioning unit are different from certificates and identification codes on other air-conditioning units. For example, during manufacturing of the air-conditioning units, different certificates and identification codes can be added to the unlock systems 100. At the same time, the certificates and the corresponding identification codes are stored in a database, and the database is associated with the server 300. Therefore, after obtaining the identification code in step S3, the server 300 can search the database for a corresponding certificate according to the identification code, and use the corresponding certificate to generate an unlock password in step S4.

If no corresponding certificate can be found according to the identification code obtained in step S3, the identification code in the unlock system 100 may be erroneous or may be a forged identification code. The server 300 performs corresponding processing according to known safety rules, thus improving the safety of the whole unlock system.

Steps S3 and S4 are not shown in FIG. 1. It is easy to understand that steps S3 and S4 are performed in the server 300, and can be performed by any suitable computer system or data processing system in the server 300.

In step S5, the server 300 sends the unlock password to the user terminal device 200. Similarly, the sending operation can also be performed by any above-mentioned suitable communication means.

In step S6, the user terminal device 200 displays the unlock password. The user terminal device 200 can include a display apparatus capable of displaying the unlock password, or can present the unlock password by means of sound, audio, or the like.

In step S7, an unlock password is input through an input device 120. The unlock password can be input by, for example, the user 400, and can also be input in any other suitable manner.

In step S8, the control apparatus 130 compares the generated unlock password with the input unlock password to judge whether to grant a corresponding permission. In an embodiment of this application, the operation of grating a corresponding permission includes granting a control or debugging permission of the air-conditioning unit in a predetermined time. For example, after the permission is granted, a specific control page can be browsed, or a specific control and debugging operation can be performed, including displaying content and a page corresponding to the permission on the display apparatus 110.

The operation of granting a permission can include granting a permission in a predetermined time. The predetermined time can be any suitable preset time length or a time length set by the user, and can be several seconds to several months. The time length or countdown thereof can also be displayed on the display apparatus 110, to inform the user 400 of the remaining operating time.

There may be a potential safety risk if the generated unlock password is inconsistent with the input unlock password. The reason for the inconsistency may be a potential malicious attack, or a data error or human error in any of the above steps. When the inconsistency occurs, the control apparatus 130 will operate appropriately to prevent the potential malicious attack. For example, when the generated unlock password is inconsistent with the input unlock password for several times successively, the display apparatus 110 can be locked for a period of time, or any operation associated with permission granting can be rejected. Therefore, the unlock system and unlock method according to this application can prevent or reduce the risk caused by a malicious attack at least to some extent.

Figure 2:
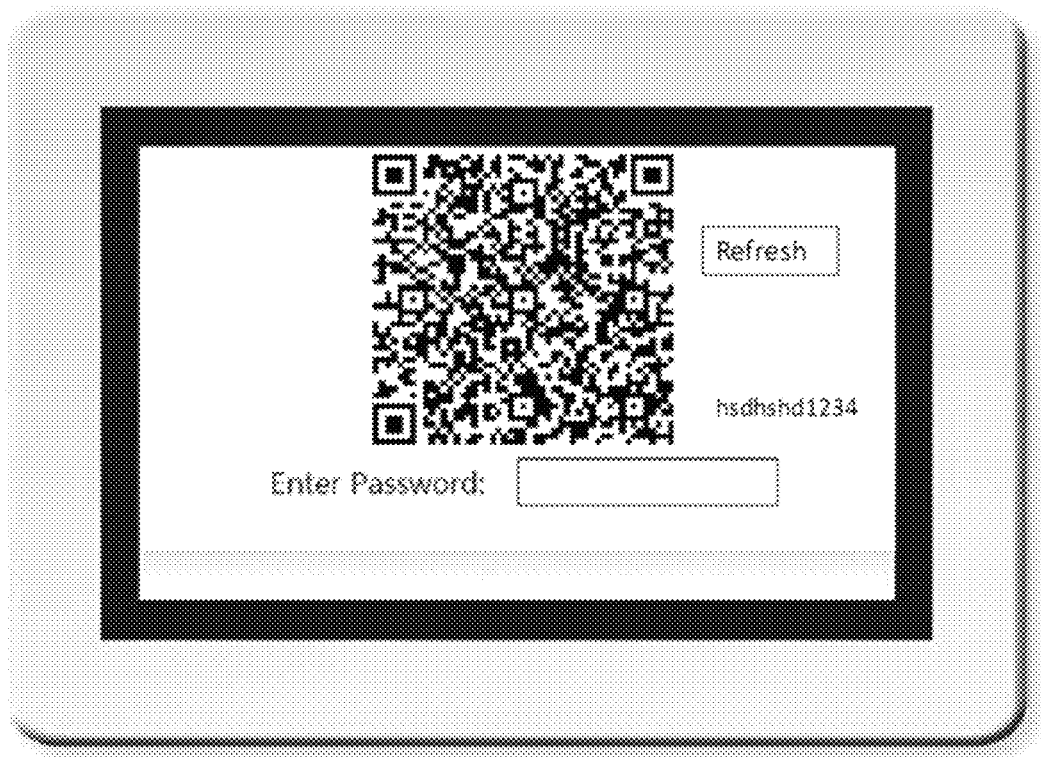
FIG. 2 is a display picture of an embodiment of a display apparatus according to this application.

FIG. 2 is a display picture of an embodiment of a display apparatus according to this application. The display apparatus 110 is a known display, e.g., an LCD display screen disposed on the air-conditioning unit. The display screen can have a function of touch screen input.

An exemplary two-dimensional code or QR code is shown on the display apparatus 110. The two-dimensional code is generated according to step S1 described above, and includes at least information of an identification code and an update code. A "Refresh" virtual button is further displayed on the display apparatus 110. The user 400 can manually touch the button to send a manual refresh request. After the manual refresh request is received, a new update code will be generated and the previous update code will be discarded. That is, a new update code will be generated each time the user presses the "Refresh" virtual button manually. An exemplary numeral "hsdhshd1234" is further displayed on the display apparatus 110. The numeral is digital content of the exemplary two-dimensional code or QR code. The user manually inputs the numeral to the user terminal device 200 when the two-dimensional code or QR code cannot be scanned or photographed by using the user terminal device 200 in step S2, to facilitate subsequent operations.

It is easy to understand that the two-dimensional code or QR code is merely exemplary, so does the exemplary numeral. Moreover, the numeral shown in the drawing is not necessarily directly corresponding to the two-dimensional code shown in the drawing.

A password input field is further displayed on the display apparatus 110. The password input field is used for the user 400 to manually input the unlock password in step S7. The unlock password can be input by using a physical key that is not shown, or input by using a virtual key that will be shown on the display apparatus 110.

The displaying in FIG. 2 is merely exemplary, and different displaying can be made according to actual requirements.

With the unlock method and unlock system, a password can be provided according to actual requirements to unlock an air-conditioning unit, and illegal login of an unauthorized user can be effectively avoided, thus reducing the risk of a malicious attack, and effectively improving the safety of the air-conditioning unit.

This application is disclosed in the specification with reference to the accompanying drawings, and those skilled in the art are further enabled to implement this application, including manufacturing and using any apparatus or system, choosing suitable materials, and using any combined method. The scope of this application is defined by the technical solution claimed for protection, and includes other examples conceivable to those skilled in the art. Other examples should be considered as falling within the protection scope determined by the technical solutions claimed in this application, as long as such other examples include structural elements that are not different from the literal expression of the technical solutions claimed or such other examples include equivalent structural elements that are not essentially different from the literal expression of the technical solutions claimed.

What is claimed is:

1. An unlock method for an air-conditioning unit, comprising:
    S1: a control apparatus generating a dynamic graphic based on at least an identification code and an update code and presenting the dynamic graphic on a display apparatus, and generating an unlock password based on a certificate, the identification code and the update code, wherein the update code is regenerated to change the dynamic graphic;
    S2: a user terminal device acquiring the dynamic graphic and sending the dynamic graphic to a server;
    S3: the server decoding the dynamic graphic to obtain at least the identification code and the update code;
    S4: the server obtaining an unlock password according to the certificate, the identification code and the update code;
    S5: the server sending the unlock password to the user terminal device;
    S6: the user terminal device displaying the unlock password;
    S7: inputting the unlock password through an input device; and
    S8: the control apparatus comparing the generated unlock password with the input unlock password to judge whether to grant a corresponding permission.

2. The unlock method according to claim 1, wherein the update code is regenerated according to one of the following conditions: a predetermined time has expired, or a manual refresh request is received.

3. The unlock method according to claim 1, wherein the dynamic graphic comprises a QR code, a bar code, a numeral, a letter, or a combination thereof.

4. The unlock method according to claim 1, wherein in step S2, the user terminal device acquires the dynamic graphic through an optical input device or by manual input of the user.

5. The unlock method according to claim 1, wherein the update code comprises a randomly generated character string.

6. The unlock method according to claim 1, wherein the certificate is a share certificate stored in the server and the control apparatus, and an algorithm for the control apparatus to generate the unlock password in step S1 is the same as an algorithm for the server to generate the unlock password in step S5.

7. The unlock method according to claim 6, wherein the algorithm comprises an irreversible hash algorithm.

8. The unlock method according to claim 6, wherein the server stores a series of identification codes and certificates corresponding to the identification codes, and in step S4, the server looks for a certificate corresponding to the identification code according to the identification code.

9. The unlock method according to claim 1, wherein the identification code comprises a MAC address.

10. The unlock method according to claim 1, wherein the step of granting a corresponding permission to the user comprises granting a control or debugging permission of the air-conditioning unit in a predetermined time.

11. An unlock system for an air-conditioning unit, comprising:
a display apparatus;
an input apparatus in communication with the display apparatus; and
a control apparatus configured to perform the following operations:
generating a dynamic graphic based on at least an identification code and an update code, wherein the update code is regenerated to change the dynamic graphic;
presenting the dynamic graphic on the display apparatus;
generating an unlock password based on at least a certificate, the identification code and the update code;
receiving an unlock password through the input apparatus;
comparing the unlock password received from the input apparatus with the generated unlock password; and
granting a corresponding permission if the acquired unlock password is consistent with the generated unlock password.

12. The unlock system according to claim 11, wherein the control apparatus regenerates the update code according to one of the following conditions: a predetermined time has expired, or a manual refresh request is received.

13. The unlock system according to claim 11, wherein the dynamic graphic comprises a QR code, a bar code, a numeral, a letter, or a combination thereof.

14. The unlock system according to claim 11, wherein the update code comprises a randomly generated character string.

15. The unlock system according to claim 11, wherein the control apparatus generates the unlock password according to an irreversible hash algorithm.

16. The unlock system according to claim 11, wherein the identification code comprises a MAC address.

17. The unlock system according to claim 11, wherein the granting a corresponding permission to the user comprises granting a control or debugging permission of the air-conditioning unit in a predetermined time.

18. The unlock system according to claim 17, wherein the operation of granting a corresponding permission to the user comprises displaying content and a page corresponding to the permission on the display apparatus.

19. The unlock system according to claim 11, wherein the display apparatus comprises a touch screen.

20. The unlock system according to claim 19, wherein the input apparatus comprises a physical keyboard or a virtual keyboard located on the touch screen.

\* \* \* \* \*